(No Model.) 2 Sheets—Sheet 2.
V. WEBER.
REGISTER FOR GRAIN WEIGHING AND MEASURING MACHINES.
No. 518,083. Patented Apr. 10, 1894.
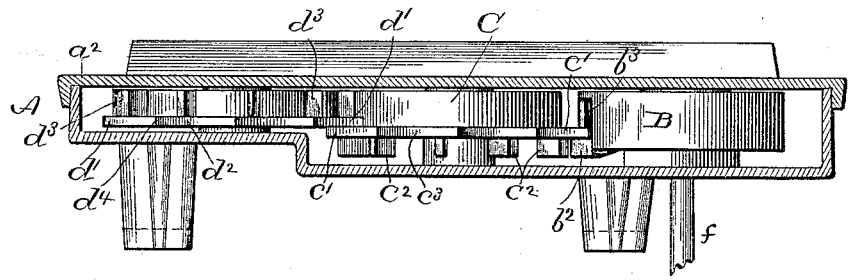
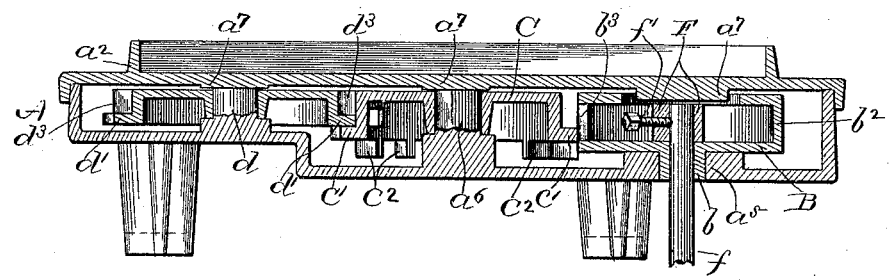
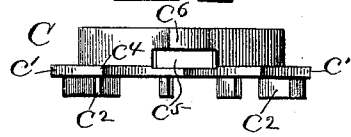
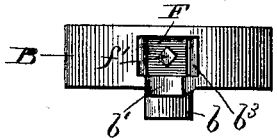
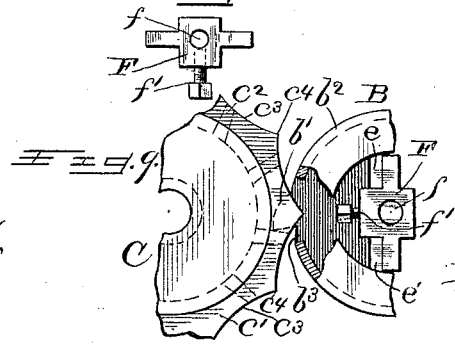
Witnesses:
Arthur E. Durand
H. M. Richards
Inventor:
V. Weber
By W. B. Richards
his Atty.

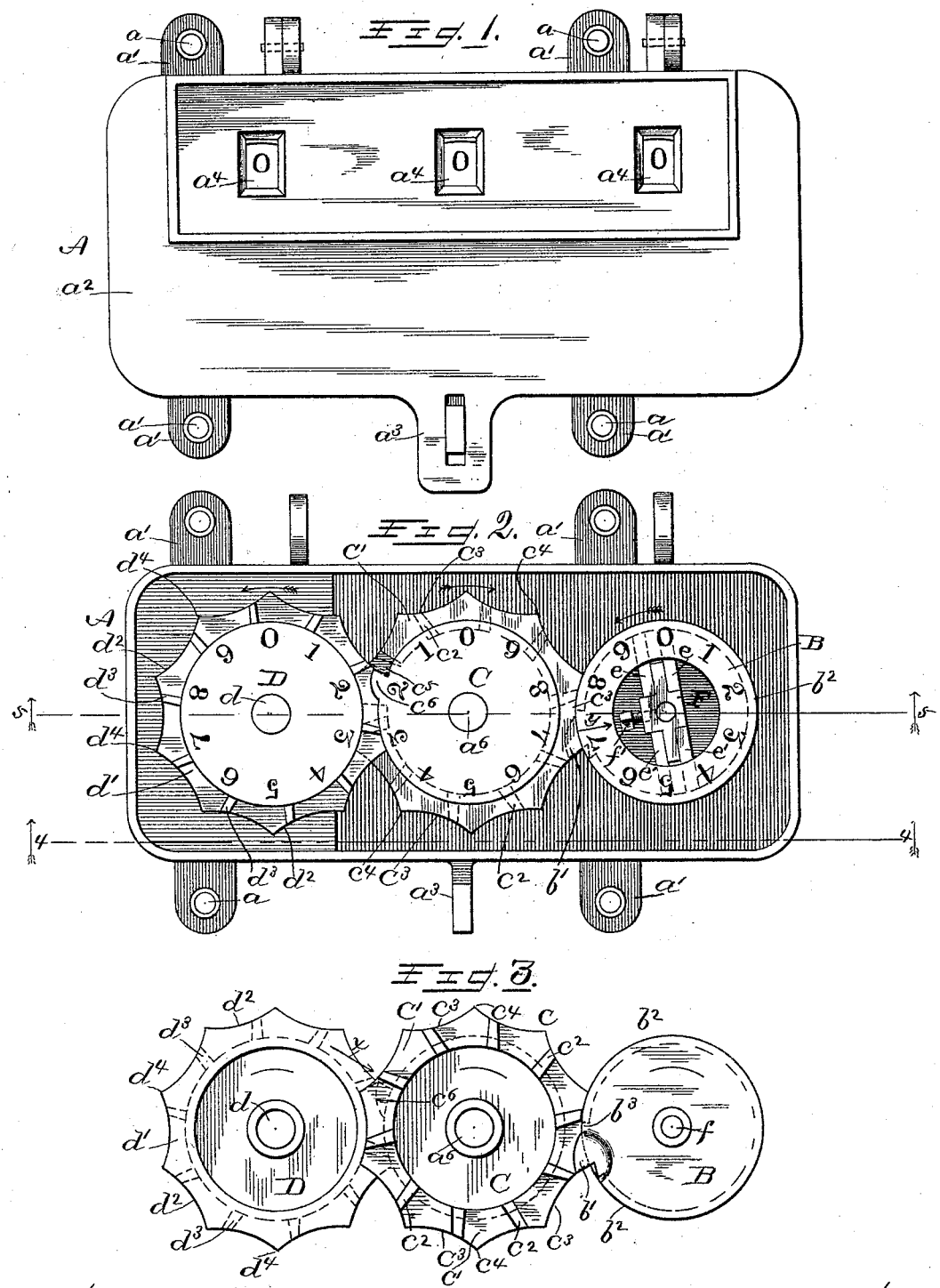

UNITED STATES PATENT OFFICE.

VALENTIN WEBER, OF PRINCEVILLE, ILLINOIS.

REGISTER FOR GRAIN WEIGHING AND MEASURING MACHINES.

SPECIFICATION forming part of Letters Patent No. 518,083, dated April 10, 1894.

Application filed January 6, 1893. Serial No. 457,448. (No model.)

*To all whom it may concern:*

Be it known that I, VALENTIN WEBER, a citizen of the United States, residing at Princeville, in the county of Peoria and State of Illinois, have invented certain new and useful Improvements in Registers for Grain Weighing and Measuring Machines, of which the following is a specification.

This invention relates to registers for automatically indicating numbers or quantities of any kind, but which are designed more especially for registering rotations of parts, or reciprocating movements of parts, such for instance as the movements of an automatically operating grain weighing hopper, or the rotations of a shaft which rotations are timed with the movements of such grain hopper.

The object of the improvement herein specified is to provide a register in which no springs are used, in which the dial carrying wheels are locked against forward or backward movement, except at the proper time to be moved, which wheels will be positive in their movements, and in their rests and therefore perfectly accurate in their indications, which are connected with the driving shaft in such manner as to facilitate resetting the registering wheels, and which are at the same time simple and strong in their construction, economic of manufacture, and not liable to get out of order.

The novel means employed in carrying out the objects of my invention, are hereinafter described, and made the subject matter of the claims hereto appended.

The preferred construction of parts, and organization thereof are illustrated in the accompanying drawings, in which—

Figure 1, is a top plan of an inclosing case in which the operating parts of the register are mounted; Fig. 2, a top plan of the registering mechanism, and of the case with its lid removed; Fig. 3, a plan of the registering wheels or disks, shown in same relative positions as shown at Fig. 2, but seen from below, or looking upward; Fig. 4, a side elevation of the working parts, and sectional elevation of the case in line 4—4, in Fig. 2; Fig. 5, a sectional elevation of the case and working parts in line 5—5, in Fig. 2; Fig. 6, a side elevation of the tens-wheel, as seen in the direction indicated by the arrow $x$, at Fig. 3; Fig. 7, a side elevation of the units-wheel, as seen in the direction indicated by the arrow $y$, at Fig. 2; Fig. 8, a top plan of the means shown for engaging the units-wheel with a rotating shaft; Fig. 9, a top plan of the adjacent parts of the units-wheel and tens-wheel when in such relative positions as to interengage, to permit of the units-wheel partially rotating the tens-wheel.

In describing the different figures of the drawings, it has been assumed that the register is mounted on any desired mechanism, with the face side uppermost as shown at Fig. 1. It may be mounted however with such face side in elevation or otherwise, and is fixed in place in an ordinary manner, by the bolts $a$ which pass through the feet $a'$ which project from the case A. The case A is of ordinary construction, with a hinged lid $a^2$ which affords access to its interior, has provision $a^3$ for a lock, and has apertures $a^4$ through which readings may be taken from the graduated dials or faces on the wheels B, C, D, which rotate in the direction shown by the arrows at Fig. 2. The units-wheel B has a tubular stud $b$ on its under side, which is journaled in a bearing $a^5$, see Fig. 5, in the bottom part of the case A, and has a lug or tappet $b'$ see Fig. 2 projecting from near the lower side of its peripheral wall $b^2$ above or over which is a recess or aperture $b^3$ in said wall see Figs. 3, 5, and 7—the wheel B preferably, but not necessarily being hollow, as shown. The upper surface or dial of the units-wheel B is graduated or marked circularly into ten regular intervals, which are designated consecutively with the numerals or figures 0 to 9, in an ordinary manner, as shown. A pair of lugs $e$ are fixed to and project inwardly from one side of the wheel B, and a similar pair $e'$ project inwardly from the diametrically opposite side of said wheel. A cross-shaped block F, see Figs. 2 and 8, fits snugly in the interspaces between the lugs $e$, $e'$ see Figs. 2 and 9, and has a hole in which the drive shaft $f$ is held by a set screw $f'$. The shaft $f$ also passes through the tubular stud $b$. The shaft $f$ is thus connected by means of the block F and set screw $f'$ with the units-wheel and may be geared in any ordinary manner with a grain meter or other device so as to be operated thereby, and thereby operate the registering mechanism. By loosening the set screw $f'$ the shaft $f$ may be readily and easily removed, or by removing the bolts $a$ the entire registering mechanism and case may be removed without disturbing the shaft $f$. The block F may also be removed when the set-screw is removed.

If preferred a ratchet mechanism, or any other ordinary device or trip may be used to transmit motion from either a rotating or reciprocating grain measurer as the case may be or other device to the units-wheel. Such intermediate devices being so common and well known it is not deemed necessary to show them in the drawings.

The tens-wheel C, is journaled on a stud $a^6$ which projects upwardly from the bottom of the case A, and has a circular series of numerals or figures from 0 to 9 on its dial face, marking its graduations in the same manner as the units-wheel. An annular flange $c'$ projects from the lower part of the periphery of the wheel C, and has a series of ten lugs $c^2$ projecting downwardly from its lower side, a number corresponding with the number of graduations on the dial of said wheel. The lugs $c^2$ are located in and revolve in the same plane of revolution as the lug or tappet $b'$. The flange $c'$ has also a series of ten indentations $c^3$ or one indentation to each lug $c^2$, and these indents are curved to have a conformity of outline with the periphery of the wheel B, as shown best at Fig. 2. Points $c^4$ are formed by the union of the indentations $c^3$. As the units-wheel B is rotated the circular series of numerals on its dial will be exposed successionally, at the opening $a^4$ which is in the path of their revolution, and readings can be taken in the ordinary manner therefrom. At each rotation of the wheel B, its tappet $b'$ will come in contact with one of the lugs $c^2$ of the tens-wheel C and move the tens-wheel the one tenth of a complete rotation, and thus bring the figures on its dial successionally beneath the opening $a^4$ which is in the path of their revolutions, whereby readings can be made in the ordinary manner, each numeral indicating a complete rotation of the units-wheel. The periphery of the units-wheel fitting, as it does, in an adjacent indentation $c^3$ of the flange $c'$, of the tens-wheel, as shown at Fig. 2, will permit free rotation of the units-wheel, while movement either forward or backward of the tens-wheel will by the same means be prevented, and the tens-wheel thus be held locked against movement until the tappet $b'$ comes in contact with one of the lugs $c^2$ and gives the necessary one tenth of a rotation to the tens-wheel, and which partial rotation is permitted by the adjacent point $c^4$, following the tappet $b'$ at that moment, passing into the recess $b^3$ as shown at Fig. 9. Immediately after the tens-wheel movement takes place, as described, another indentation $c^3$ contacts the periphery of the units-wheel and again locks and holds the tens-wheel against forward or backward movement until the tappet $b'$ is again brought into engagement with one of the lugs $c^2$ and a movement of the tens-wheel again takes place as hereinbefore described.

Above the flange $c'$ of the tens-wheel C and in the same radial plane as one of the points $c^4$ is a recess $c^5$ in the periphery of the wheel C, and above the recess $c^5$ and in the same radial plane is a radially projecting tappet $c^6$, which recess and tappet interact with parts of the hundreds-wheel D in imparting rotations thereto as hereinafter described.

The hundreds-wheel D is journaled on a stud $d$ which projects from the bottom of the case A and has its dial face graduated circularly and the graduations numbered from 0 to 9, as shown, and in the same manner as the tens-wheel, and the units-wheel, and so located that the numerals 0 to 9 will pass successionally beneath the opening $a^4$ which is over their path as they are revolved by the rotations of the wheel D. An annular flange $d'$ projects from the lower part of the periphery of the wheel D, in a plane above the flange $c'$ of the wheel C, and this flange has a series of ten indentations $d^2$ or one indentation to each lug $d^3$ of a series of ten lugs which project radially from the periphery of the wheel D above the flange $d'$, and in the same plane of rotation as the tappet $c^6$ on the wheel C. The indentations $d^2$ are connected by points $d^4$. At each rotation of the wheel C its tappet $c^6$ will come in contact with one of the lugs $d^3$ and give the wheel D a partial rotation or one tenth of a complete rotation, and thereby bring one of the indicating numerals on its dial face beneath the overlying aperture $a^4$. At the moment that the tappet $c^6$ is in contact with a lug $d^3$, one of the points $d^4$ will pass into the recess $c^5$, and thereby permit such partial rotation of the wheel D, said wheel D being held or locked against forward or backward movement during all other parts of the rotation of the wheel C by means of its indentations $d^2$ which have a conformity of outline with the periphery of the wheel C and rest against said periphery for the purpose of locking the wheel D, in the same manner as the indentations $c^3$ rest against the periphery of the wheel B to lock the wheel C at the proper time. After the register has been used, or the wheels B, C, D, rotated in any manner, and before again using the register, the wheels can be readily, easily and quickly reset or replaced, with the figure 0 on each of the dials in such position as to rest beneath its respective aperture $a^4$, as follows: The lid $a^2$ being first opened, the wheels C and D can be lifted out of or removed from the case A. The shaft $f$ then being also free for movement endlong of itself, can be so moved, to raise the block F out of its seat in the lugs $e, e'$, and thus free the wheel B, which can then be rotated by hand to bring its 0 mark into proper position. The shaft $f$ is then moved in an opposite direction to reseat the block F in the lugs $e, e'$. The wheels C and D are then replaced in proper positions, and the lid $a^2$ being then closed will hold them and the shaft $f$ against movement transversely of their planes of rotation, while permitting them to rotate when actuated by the shaft $f$, as hereinbefore described.

It will be seen that by the means described the dial wheels can be accurately and properly reset, after use and before using again, to commence registering at the lowest number, without removal of any set screws or other similar parts, and without the use of wrenches, screw drivers or other tools of any kind. It will be evident that the block F may be of different forms, its essential requirement being that it is multisided, or oblong in horizontal section, and is seated in a correspondingly shaped seat in the units-wheel, from which it can be removed with the shaft $f$ as described, and so that it will rotate the units-wheel in unison with the shaft $f$.

The readings of the dial indications are made in the ordinary manner and do not require description herein.

Having thus described my invention, what I claim as new, and desire to secure by Letters Patent, is—

1. In a register, and in combination substantially as hereinbefore described, a units wheel having an aperture $b^3$ in its periphery, a tappet $b'$ projecting from its periphery, and lugs $e, e'$, at its central part, a drive shaft $f$ projecting into the units wheel and provided with a block, as F, fixed thereto, and removably seated in the lugs $e, e'$, a tens wheel having an annular flange $c'$ with indentations $c^3$, lugs $c^2$ and aperture $c^5$, and a hundreds wheel having lugs $d^3$ and an annular flange $d'$ with indentations $d^2$ in its outer edge, whereby the hundreds wheels and the tens wheel may be removed, and the units wheel and said tens wheel and hundreds wheel then reset substantially as described.

2. In a register, and in combination substantially as hereinbefore described, with a units wheel having lugs $e$ and $e'$, a multisided block, as F, removably seated in a correspondingly shaped interspace between said lugs, a drive shaft, as $f$, to which said block is fixed, whereby said block and shaft can be removed from the units wheel for resetting said wheel, substantially as described.

In testimony whereof I affix my signature in presence of two witnesses.

VALENTIN WEBER.

Witnesses:
JOSEPH GERMAN,
SCOTT WEAVER.